July 14, 1931.                P. SPENCE                 1,814,530
                            REGULATING VALVE
                          Filed Oct. 21, 1925
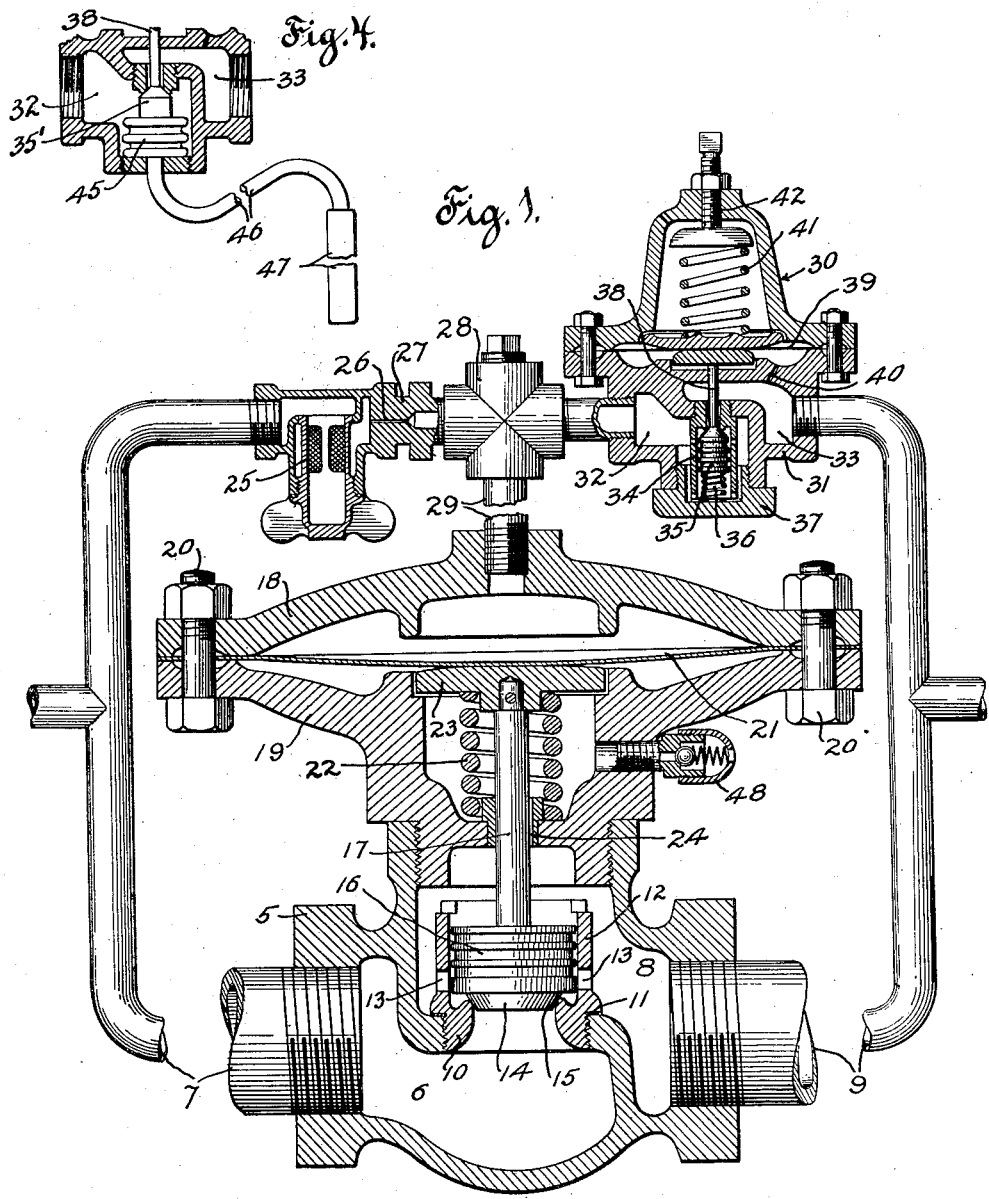
INVENTOR
Paulsen Spence
BY
Mitchell Bechert
ATTORNEYS Patented July 14, 1931

1,814,530

UNITED STATES PATENT OFFICE

PAULSEN SPENCE, OF ORANGE, NEW JERSEY

REGULATING VALVE

Application filed October 21, 1925. Serial No. 63,920.

My invention relates to a regulating valve for steam, air or other fluid.

It is the general object of my invention to improve the construction of a regulating valve and to provide one which will be relatively simple in construction, reliable in operation, and relatively cheap to manufacture.

It is a more specific object to provide an improved regulating valve in which the flow of fluid therethrough is stopped by means under the influence of the high pressure fluid acting upon a movable member.

It is a further object to provide a valve in which provision is made for reducing the wear on the valve proper and valve seat usually caused by the flow of fluid.

Other objects will appear as the specification proceeds.

Briefly stated, in the preferred form of the invention I employ a main regulating and reducing valve having an inlet side for high pressure fluid and an outlet side for low pressure fluid. A suitable valve controls the communication between the high and low pressure sides of the valve, and this valve is preferably controlled by means of a diaphragm, to be acted upon by fluid pressure. The valve may be moved, preferably toward the open position, by means of a spring. The main valve is preferably moved toward the closed position by means of high pressure fluid acting upon a diaphragm. The high pressure fluid is preferably constantly admitted in very limited quantity to the high pressure side of the diaphragm, and is normally vented therefrom so as not to depress the same. As soon as the fluid pressure rises in the low pressure side or as soon as means under the influence of this low pressure fluid reaches a predetermined point or condition, the venting of the high pressure fluid from the main diaphragm is stopped and the pressure is permitted to build up, so as to close the main valve for terminating or limiting the flow of high pressure fluid to the low pressure side of the main valve.

In the drawings which show, for illustrative purposes only, preferred forms of the invention—

Fig. 1 is a sectional view of one embodiment of the invention, parts being diagrammatically shown;

Fig. 4 is a fragmentary, partially diagrammatic, view of a modified detail.

In Fig. 1, 5 indicates the main valve casing having an inlet side 6 for high pressure fluid, to which a suitable conduit 7 is connected for conducting high pressure fluid thereto. The valve casing has a low pressure side 8, to which is connected a low pressure pipe 9 for conducting low pressure fluid to the point of use. Communication between the sides 6 and 8 may be afforded by the passage through the valve seat member 10, which, if desired, may be integral, screw-threaded or otherwise secured to the valve casing 5, either with or without the interposition of the gasket 11.

In the form shown the seat member 10 is provided in the low pressure side of the casing with an upstanding cylindrical flange 12, having one or more ports 13—13 extending transversely therethrough. The valve member 14 is adapted to coact with the seat 15 on the seat member 10, so as to control the flow of fluid from one side of the valve to the other. The valve member 14 is provided with a piston 16, fitting within the cylinder 12 and being of such length as to close the port or ports 13 when the valve 14 is seated. The purpose of this arrangement of valve, piston and ports is for preventing scoring or wear on the seat or valve. When the valve is raised slightly the fluid cannot yet escape until the piston uncovers the ports 13—13, and these ports serve to restrict or wire draw the flow to such an extent that the fluid flowing past the valve and seat moves relatively slowly, and scoring is thus prevented. Most of the wear due to fluid flow thus is taken by the piston and ports.

The valve and piston are preferably secured to a valve stem 17 passing up into a diaphragm chamber which may be formed of two dished members 18—19, secured together as by means of bolts 20—20 and holding the diaphragm 21 therebetween. A light spring 22 may be located in the diaphragm chamber and may abut the head 23 on the end of the valve stem, so that the spring constantly urges the valve away from its seat. A leak port, such as the enlargement 24 of the passage for the valve stem, permits low pressure fluid to leak past the valve stem and act upon the bottom of the diaphragm 21. It should be understood that the enlargement or passage 24 is so small or fine as to prevent rapid filling or emptying of the space at the low pressure side of the diaphragm. High pressure fluid acts upon the upper side of the diaphragm at certain times and serves to force the valve 14 down onto its seat.

In the form shown a connection from the high pressure line conducts high pressure fluid preferably through a strainer device 25 and through a bleed opening or port 26 in the connection 27, connected into a cross 28, affording communication with the upper side of the diaphragm through a pipe 29. The bleed opening 26 thus permits a small but constant flow of high pressure fluid to the upper side of the diaphragm. When the valve is operating normally, that is, when the valve member 14 is off its seat and fluid is flowing through the valve, the high pressure fluid passing through the bleed port 26 is vented through a pilot or auxiliary valve designated generally 30, which is connected to the discharge or low pressure line 9. When the pressure rises in the low pressure line this venting of the high pressure fluid through the bleed port 26 is stopped, as will be later described, and the pressure of high pressure fluid is permitted to build up in the upper part of the diaphragm chamber above the diaphragm, and this high pressure is sufficient to overcome the force of the spring 22 and the force of the low pressure fluid acting below the diaphragm and the main valve 14 is closed, thus stopping the flow of the high pressure fluid through the valve into the line 9.

In the form shown, the auxiliary of pilot valve 30 includes the valve casing 31, having a high pressure side 32 communicating with the space at the upper side of the diaphragm 21, and a low pressure side 33 which may be in communication with the low pressure side of the main valve through 9. A valve seat member or cartridge 34, similar in all substantial respects to the seat member 10 previously described, affords communication between the high pressure side 32 and the low pressure side 33 of the auxiliary or pilot valve. The piston valve 35 is preferably spring pressed toward the closed position by suitable means, as a spring 36 acting beneath the valve and abutting the cap 37, closing the lower end of the auxiliary valve casing. The auxiliary valve stem 38 extends upwardly into the auxiliary diaphragm chamber and may engage the lower side of the diaphragm or a suitable plate thereon. The underside of the auxiliary diaphragm 39 is acted upon by the low pressure fluid entering the lower portion of the diaphragm chamber through a small leak port 40, which maintains pressure beneath the diaphragm, the same as in the low pressure side of the main valve. A spring 41, the tension of which may be adjusted as by means of a screw 42, acts above the diaphragm 39 and tends to move the valve 35 away from its seat, so as to permit the escape of high pressure fluid which has entered through the bleed port 26. Obviously, when the low pressure fluid in the discharge or outlet pipe 9 rises to a predetermined point the pressure on the under side of the diaphragm 39 caused by this low pressure fluid is sufficient to overcome the force of the spring 41 acting thereabove, and the auxiliary valve 35 is thus permitted to close under the influence of the spring 36. As soon as this auxiliary valve is closed, the pressure caused by the high pressure fluid entering through the bleed port 26 is permitted to build up above the main diaphragm 21 and the main valve 14 is forced downwardly toward or onto its seat. As soon as the pressure from the low pressure side of the main valve decreases below a predetermined point, the auxiliary valve spring 41 forces the auxiliary valve 35 away from its seat, and the high pressure fluid above the main diaphragm 21 is thus vented after which the low pressure fluid acting below the main diaphragm 21, the spring 22, and pressure below main valve raises the main valve 14 from its seat, and the flow of high pressure fluid into the low pressure line 9 is again permitted.

It is to be observed that in both the main valve and auxiliary valve casings the main flow of fluid does not impinge directly upon the diaphragm but rather upon a deck or part extending below and forming part of the diaphragm chamber. This provision makes for longer life of the diaphragm.

In order to prevent the building up of an excessive pressure beneath the diaphragm 21 due to leakage of high pressure fluid or from other cause, such as resistance to flow of fluid from the lower side of the diaphragm through passage 24, I may employ a suitable relief valve 48 for relieving said pressure.

The control in that form of the invention shown in Fig. 1 manifestly is dependent upon the rise or fall of pressure in the low pressure side of the line. With some types of apparatus it is desirable to make the control dependent upon other means, for example the vent valve may be controlled by means dependent upon the will of the operator or controlled by a different automatic or semiautomatic means such as a solenoid or a thermostatic means which latter may be under the influence of pressure in the low pressure line.

In Fig. 4 I have indicated more or less diagrammatically one modified arrangement, by means of which the auxiliary valve 35' which, in this modification, would take the place of the auxiliary valve 35, is operated by thermostatic means. A suitable expansible device, such as a metallic bellows or sylphon 45, is arranged to actuate the valve and is in communication through suitable tubing 46 with a reservoir 47 containing some expansible or volatile fluid, which reservoir 47 may be acted upon, either by the fluid in the low pressure line or is positioned in some device which is in some way controlled or affected by fluid in the low pressure line. Thus, when the fluid in the reservoir 47 is volatilized or expanded, due to too great a flow of fluid in the low pressure line, the valve 35' closes and the pressure above the main diaphragm 21 of the main valve is acted upon by the high pressure fluid entering through the bleed opening 26, and the main valve 14 is thus forced to its seat so as to cut off the flow. As soon as such conditions arise as to permit the fluid in the reservoir 47 to contract or condense, as the case may be, the valve 35' is moved off its seat and the main valve 14 again opened, as previously described. The subject matter of Fig. 4 is specifically claimed in my co-pending application Serial No. 535,870, filed May 8, 1931.

It will be obvious that the pilot valve shown in Fig. 1, itself acts as a reducing or regulating valve.

While the invention has been described in great detail and various combinations and modifications illustrated, I do not wish to be confined to the exact forms and combinations shown, since may changes may be made. Various features of the invention may be advantageously employed separately or combined with other elements. I desire to protect all such changes coming within the scope of the invention as defined in the appended claims.

I claim:

1. In a regulating valve, a valve casing having a high pressure side and a low pressure side, a valve for controlling the flow of fluid from one side of said valve casing to the other, a diaphragm chamber, a diaphragm therein, means for causing said valve to be actuated in at least one direction by said diaphragm, means for bleeding fluid under pressure to each side of said diaphragm, valve means for quickly venting pressure fluid from each side of said diaphragm at different times, and a spring in said diaphragm chamber on the valve casing side of said diaphragm, said spring being located out of the path of fluid through said valve casing and being completely housed by said diaphragm chamber.

2. In a regulating valve, a valve casing having a high pressure side and a low pressure side, a valve for controlling the passage of fluid from one side of said valve casing to the other, a diaphragm chamber, a diaphragm therein, means for causing said valve to be actuated in at least one direction by said diaphragm, a spring in said diaphragm chamber at the valve casing side of said diaphragm for urging said valve in one direction, means for bleeding high pressure fluid to one side of said diaphragm and means for bleeding low pressure fluid to the opposite side of said diaphragm.

3. In a regulating valve, a valve casing having a high pressure side and a low pressure side, a valve seat and valve member for said seat for controlling passage of fluid from one side of said valve casing to the other, said valve casing having an opening therein of a size to permit withdrawal of said valve and seat therethrough, a diaphragm chamber detachably mounted above said opening, a diaphragm in said chamber and dividing the latter into a high pressure diaphragm chamber and a low pressure diaphragm chamber, said diaphragm chambers being out of communication with fluid passing through said valve casing except for a very small bleed opening for conducting fluid to one side of said diaphragm, means including a very small bleed opening for conducting fluid to the opposite side of said diaphragm, a spring in one of said diaphragm chambers for urging said valve in one direction, and means for controlling the fluid pressure in one of said diaphragm chambers for actuating said valve, said valve being immediately removable from said valve casing with said diaphragm chamber.

PAULSEN SPENCE.